United States Patent [19]

Bramwell

[11] 4,183,687
[45] Jan. 15, 1980

[54] PIVOTAL JOINT WITH REDUNDANT CONNECTING MEANS BETWEEN THE TWO PIVOTALLY JOINED PARTS THEREOF

[75] Inventor: Frank Bramwell, Hamden, Conn.

[73] Assignee: United Technologies Corporation, Hartford, Conn.

[21] Appl. No.: 916,332

[22] Filed: Jun. 15, 1978

[51] Int. Cl.² ............................................. F16C 11/00
[52] U.S. Cl. ...................................... 403/11; 74/469; 403/159; 403/121; 403/161
[58] Field of Search ................. 403/11, 121, 161, 162, 403/163, 123, 157, 286, 287, 119, 157, 158, 159, 332, 381; 74/519, 469; 244/83 J, 131

[56] References Cited

U.S. PATENT DOCUMENTS

| | | |
|---|---|---|
| 3,842,687 | 10/1974 | Fausler et al. .................. 403/116 X |
| 3,904,299 | 9/1975 | Loouis .................................. 403/157 |
| 4,030,378 | 6/1977 | Kroesser ............................... 403/116 |

*Primary Examiner*—Andrew V. Kundrat
*Attorney, Agent, or Firm*—Vernon F. Hauschild

[57] ABSTRACT

A pivotal joint in which a first member having a wheel-shaped end is pivotally connected to a second member having a forked end enveloping the wheel-shaped end and including a primary pivot bolt arrangement extending through the first and second members at the center of the wheel-shaped end to pivotally join the parts, as the primary pivotal connection therebetween and wherein the forked end of the second member presents a circumferential array of three friction surfaces which will cooperate with the periphery of the wheel-shaped end of the first member to pivotally join the two parts as the secondary pivotal connection therebetween if the primary pivot connection fails.

8 Claims, 5 Drawing Figures

FIG. 4
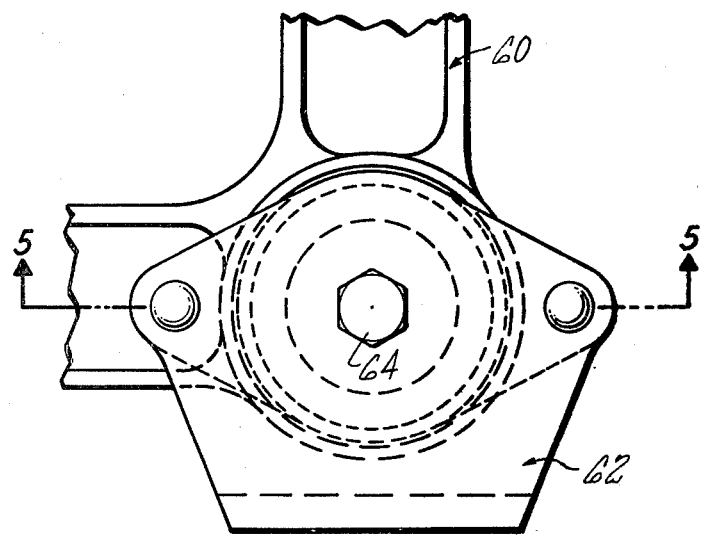
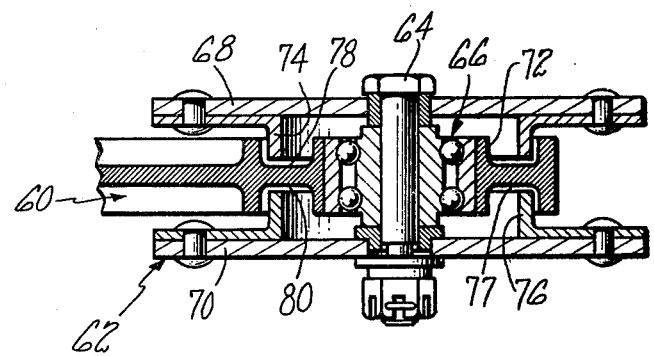
FIG. 5

PIVOTAL JOINT WITH REDUNDANT CONNECTING MEANS BETWEEN THE TWO PIVOTALLY JOINED PARTS THEREOF

The invention herein described was made in the course of or under a contract or subcontract thereunder with the Department of the Army.

BACKGROUND OF THE INVENTION

1. Field of the Invention

This invention relates to pivotal joints wherein two joined members are pivotal relative to one another and wherein the joints include redundant pivot connections therebetween so that a secondary pivot connection becomes operative should the primary pivot connection be lost, for example due to ballistic damage.

2. Description of the Prior Art

U.S. Pat. No. 4,030,378 is probably representative of and the closest prior art. It teaches a construction wherein two pivotally joined parts have a primary pivot bolt connection therebetween and a secondary pivot connection in the form of bolt-in-slot connection which serves as a redundant pivot connection if the primary pivot connection fails. This prior art construction may also utilize two bolt-in-slot connections spaced about 90° apart. This prior art construction, while adequate in operation, tends to require a large space envelope, and such a relatively large space envelope is not always available in some installations such as flight control systems of aircraft, including helicopters. Additional disadvantage of this prior art construction which the present invention overcomes is that the secondary pivot support mode is considerably less stable than the primary pivot support mode, the degree of pivot motion is restricted by the arc of the slot, it is a heavier construction and requires a greater number of parts. This slot and pin prior art construction has limitations with respect to the self-aligning capability of the joint and cannot therefore be used on a non-planar linkage unless the clearance between the slot and pin are substantial. This substantial clearance, of course, results in a sloppier joint when in the secondary mode of operation.

SUMMARY OF THE INVENTION

A primary object of the present invention is to provide a joint in which two members are pivotally joined by means of redundant pivot connections therebetween which are simple in construction, light in weight and occupy minimal space envelope.

It is still a further object of the present invention to provide such a pivotal joint wherein the primary and secondary pivotal connections each constitute a rotational connection with minimal play between the two pivotally connected parts, and wherein the elements providing the redundant pivotal connection are spaced a maximum distance from the elements of the primary pivotal connection.

It is still a further object of the present invention to teach such a joint in which the two pivotally joined parts remain in self-aligned, pivotal connection in the secondary mode throughout a substantial arc of pivot operation.

It is still a further object of this invention to teach such a joint in which the first part joined has a wheel-shaped end received in a forked end of the second joined part, wherein a primary pivot bolt connection with a self-aligning antifriction bearing extends between these two parts as the primary pivot connection therebetween, and wherein the secondary pivot connection therebetween, which operates when the primary pivot connection is lost, constitutes at least three friction surfaces carried by the forked end of the second member and selectively positioned to envelope and cooperate with the periphery of the wheel end of the first member which secondary pivot connection becomes operative when the primary pivot connection is lost.

It is still a further object of this invention to teach such a pivotable joint wherein the wheel-shaped end of the firt joined member is of minimal thickness so that when in the secondary pivotal mode of operation there is maximum lateral clearance between the joined parts throughout most of their overlapping areas, thereby reducing the likelihood of jamming between the parts due to lateral distortion of either joined member by ballistic damage.

It is still a further object of my invention to teach such a pivotal joint wherein, in the secondary pivotal mode of operation, two of the friction contact surfaces constitute removable roller members supported from th forked end of one of the members and contacting the periphery of the wheel-shaped end of the other member so that, since the roller members are readily installed or removed, the two part pivotal joint is very easily assembled and/or disassembled.

The foregoing and other objects, features and advantages of the present invention will become more apparent in the light of the following detailed description of preferred embodiments thereof as discussed and illustrated in the accompanying drawings.

BRIEF DESCRIPTION OF THE DRAWINGS

FIG. 4 is a side view of another version of a pivotable joint with redundant pivot support between the joined members.

FIG. 5 is a view taken along line 5—5 of FIG. 4.

DESCRIPTION OF THE PREFERRED EMBODIMENT

Figure 1:
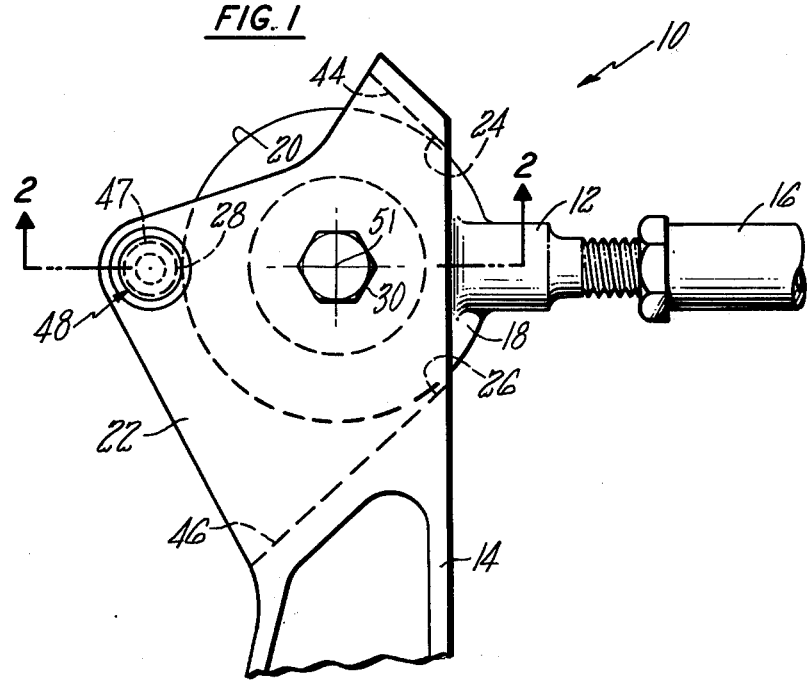
FIG. 1 is a side view of a pivot joint according to my invention.

FIG. 1 shows pivotal joint 10 comprising pivotally joined first and second members 12 and 14. While not necessarily so limited, members 12 and 14 could constitute part of an aircraft flight control system wherein member 14 is a bell crank member mounted for pivotal motion in a manner not shown, and pivotally connected at joint 10 to control rod end 12, which is in turn connected in conventional fashion to control rod 16, which control rod is operatively joined to another part of the control system. In conventional fashion, one of the members 12 or 14 may be fixed or both may be movable. As shown in the FIGS. 1 and 2 constructions, as bell crank 14 pivots about its undisclosed end, pivotable motion is produced between part 14 and 12 so as to permit part 12 to move with the moving end 22 of the bell crank. Purely for purposes of illustration, joint 10 will be described as if first and second parts 12 and 14 thereof are a control rod end and a bell crank.

Figure 2:
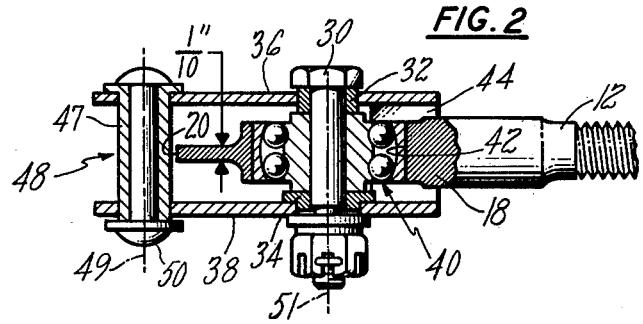
FIG. 2 is a showing taken along line 2—2 of FIG. 1.

As best shown in FIG. 1, the joined end 18 of control rod end 12 is wheel-shaped so as to define circumferential surface 20 at its periphery. Bell crank 14 has a forked end 22 with side plate members 36 and 38 thereof enveloping wheel-shaped end 18 of member 12. Primary pivot bolt 30 extends, as best shown in FIG. 2, through bushing members 32 and 34 in the side plate members 36 and 38 of the forked end of bell crank 14. In addition, a self-aligning antifriction bearing 40 is supported between circular aperture 42 in the center of control rod end wheel end 18 and has its inner race snuggly enveloping the shaft of primary pivot bolt 30 so as to provide a primary pivot connection between members 12 and 14. The purpose and significance of the self-aligning antifriction bearing 40 is to provide a low friction rotating connection between elements 12 and 14, which will allow for misalignment of one end of the rod relative to the other end, due to manufacturing tolerances. In addition the self-aligning capability is essential where a non-planar linkage is employed.

The bell crank forked end 22 presents three substantially equally circumferentially spaced contact surfaces 24, 26 and 28 about the periphery 20 of control rod end 18 and which cooperate therewith to join parts 12 and 14 in a secondary pivotal connection, should the primary pivotal connection 30 be lost by ballistic damage or otherwise. Preferably, contact points 24, 26 and 28 are formed so that there is a selected radial clearance between the outer periphery 20 of the control rod wheel end 18 and the bell crank contacting surfaces at points 24, 26 and 28. The purpose for this is so that the secondary rotational connection mode means at the three contact surfaces 24, 26 and 28 do not interfere with the pivot action of the joined parts 12 and 14 when the primary connection 30 is properly operative. For example, in a particular helicopter control linkage system in which the diameter of wheel end 18 is 2.00 inches, the radial control gap left at surfaces 24, 26 and 28 is preferably about 0.003 to 0.012. It is important that the elements forming contact points 24, 26 and 28 are a maximum distance from primary connection 30 for the survivability thereof in case of ballistic damage at 30. As best shown in FIG. 1, contact points 24, 26 and 28 provide line-contact friction surfaces between periphery 20 of wheel end 18 and surfaces 44 and 46 of bell crank 14, which surfaces 44 and 46 are oriented to be substantially tangential to the periphery 20 of the wheel-shaped end 18 of member 12, and surfaces 44 and 46 terminate substantially at their point of tangency with surface 20, thereby producing line-contact between each of surfaces 44 and 46 and periphery 20 at contact points 24 and 26. The third contact point 28 also provides line-contact because it is defined between the outer periphery 20 of member 12 and roller member 48, which is pivotally connected, as best shown in FIG. 2 about bolt or rivet-type member 50, so as to extend between plate members or side members 36 and 38 of the bell crank forked end 22 and in selective spaced relation to periphery 20 of member 12. While not necessarily so limited, as best shown in FIG. 2, roller 48 comprises roller sleeve member 47 which is flanged at one end and extends between aligned holes in side plate members 36 and 38 and is held in position for pivot motion about its axis 49 by bolt mechanism 50, which has threadably connected halves with head members at opposite ends thereof. Roller member 47 is preferably made of aluminum-bronze. It will be noted by viewing FIGS. 1 and 2 that in pivotal joint 10, the pivotally joined parts 12 and 14 therefore include a primary pivot connection therebetween consisting of primary bolts 30 and self-aligning antifriction bearing 40 joining parts 12 and 14 for normal or primary mode pivotal operation about axis 51. In addition, parts 12 and 14 are pivotally connected for a secondary mode of rotational connection, with rotational pivot connection and minimum play therebetween should the primary pivot connection 30-40 be lost, due to the three point contact between members 12 and 14 provided by the coaction of the outer periphery 20 of member 12 cooperating with circumferentially distributed tangential surfaces 44 and 46 and roller 48 of member 14 to define three circumferentially spaced contact points 24, 26, 28 between members 12 and 14 so as to have joined parts 12 and 14 continue in pivotable relationship in this second mode of operation if the first mode of operation 30 fails, which second mode of operation is also substantially about axis 51. Roller 48 is used to define support surface 28 rather than using a third tangential surface to permit assembly of part 12 into position within part 14 so as to permit the making of the primary pivotal connection between members 12 and 14 by means of pivot bolt 30 and antifriction bearing 40. It will be noted in the FIG. 1 construction, that with roller 48 removed, member 12 may be withdrawn leftwardly between surfaces 24 and 26 of bell crank 14.

As best shown in FIG. 2 it will be noted that wheel end 18 of member 12 is reduced in thickness at periphery 20 throughout most of the overlapping area which it experiences with the forked end 22 of bell crank 14. That reduced thickness dimension is roughly one-tenth of an inch, thereby providing maximum lateral clearance between the joined parts at their overlapping areas to prevent jamming therebetween due to lateral displacement of either of the joined parts by ballistic damage.

Figure 3:
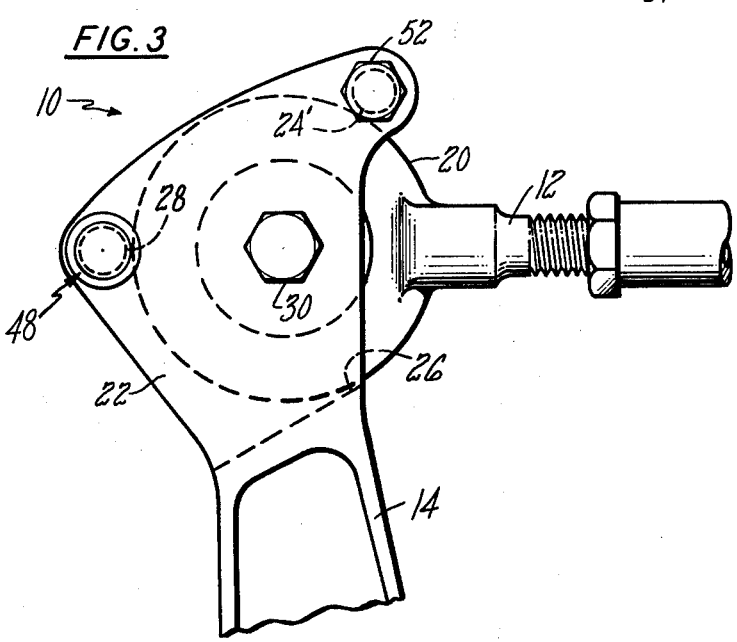
FIG. 3 is a side view of a modified version of the pivot joint.

Another embodiment of my invention is shown in FIG. 3, which construction is similar to the joint 10 of FIGS. 1 and 2 except that two roller connections are used between members 12 and 14 in the secondary pivotal connection mode. The second roller member is element 52, which is constructed and supported precisely as roller element 48 to define line-contact at contact point 24' between periphery 20 and roller 52. The construction at contact points 26 and 28 remains the same as in the FIGS. 1 and 2 construction as does primary pivot connection 30. Rollers 48 and 50 may both be single bolt connected, or roller 48 may be rivet connected. The advantage of the FIG. 3 construction is that it has excellent maintainability features in that merely by the removal of the two bolts which position rollers 48 and 52, or in fact only the one bolt for roller 52, in the forked end 22 of bell crank end 14, and the removal of primary pivot bolt 30, joined members 12 and 14 may be separated. Similarly, parts 12 and 14 may be joined with both primary and secondary pivotable connection therebetween in the FIG. 3 embodiment merely by the insertion of the two bolts which position rollers 48 and 52, or in fact only the single bolt for roller 52, after the primary pivotable connection 30 is made.

It will be noted in both the FIGS. 1-2 and the FIG. 3 constructions, that in the second pivotal mode connection between parts 14 and 12, due to the three circumferentially spaced support points 24, 26 and 28 between members 12 and 14, a self-aligning secondary mode pivotal connection is provided throughout a very substantial relative self-aligning motion between parts 12 and 14, and is not restricted to the arc of the prior art slots in the prior art pin-slot secondary pivotal mode connection. Since the friction contact at points 24 and 26 is line-contact, and at contact point 28 is both line and rolling contact, the secondary or redundant pivotal connection is of minimum friction.

FIGS. 4 and 5 show still another form of pivotal connection with redundant pivotal backup connection associated therewith. In the FIGS. 4-5 construction, bell crank 60 is pivotally joined to fixed forked member 62 through primary pivot bolt connection 64, which also utilizes a non self-aligning antifriction bearing 66 therearound.

In the FIGS. 4-5 construction member 62 is fixed in any conventional fashion, such as bolts, to a fixed surface, such as a helicopter fuselage (not shown). Member 62 is shaped to provide spaced wall members 68 and 70, one on each side of and in overlapping relationship with a portion of bell crank 60 which, as best shown in FIG. 5 is shaped to present a cylindrical wall member 72 snuggly engaging the outer periphery of the outer race of antifriction bearing 66 so that, with primary pivot bolt 64 connected as shown in FIG. 5, a primary pivot connection exists between members 60 and 62 providing a rotational, minimal play non self-aligning connection therebetween. As best shown in FIG. 5, ring shaped members 74 and 76, which are preferably made of nylon if loading permits, or for higher loaded joints, steel, are supported from the inner walls of members 68 and 70 in conventional fashion and project inwardly toward one another to define annular space 77 therebetween. Bell crank member 60 is shaped, as best shown in FIG. 5, to define annular recesses 78 and 80 therein which ring members 74 and 76 project so as to provide a secondary pivotal connection between members 60 and 62, should the primary pivotal connection 64, 66 be lost. In such an event, bell crank 60 will continue to be rotationally, pivotally connected to member 62 due to the interconnection and coaction between ring shaped members 74 and 76 of member 62 and annular recesses 78 and 80 in member 60. It will therefore be seen that in the FIGS. 4-5 construction, we have both a primary pivot connection between members 60 and 62 in primary pivot bolt 64 and antifriction bearing 66 and a secondary pivot connection operable when the first pivot connection fails, due to the cooperation of ring-shaped member 74 and 76 in annular recesses 78 and 80. Sufficient clearance is permitted between members 74 and 76 and recesses 78 and 80 so that the secondary pivot connection does not interfere with the pivot operation between members 60 and 62 when the primary pivot connection 64 and 66 is operational.

I wish it to be understood that I do not desire to be limited to the exact details of construction shown and described, for obvious modifications will occur to a person skilled in the art.

I claim:

1. A pivotal joint comprising:
   (A) a first member having a wheel-shaped end;
   (B) a second member having a forked end enveloping at least a portion of the wheel-shaped end of the first member;
   (C) a primary pivot bolt connection extending through said first and second members in selected position so as to pivotally join the first and second members for relative pivotal motion therebetween, and
   (D) second means for pivotally connecting said first and second members comprising:
      (1) at least three contact surfaces located on the forked end of said second member and selectively positioned to envelop said wheel-shaped end of said first member to present contact surfaces to engage and cooperate with the circumferential periphery of the wheel-shaped end of said first member to pivotally connect said first and second members should said primary pivot bolt connection become inoperative.

2. A pivotable joint as in claim 1 wherein said contact surfaces are substantially equally spaced circumferentially about the periphery of the first member wheel end.

3. A pivotable joint according to claim 2 wherein said contact surfaces are selectively radially spaced from the periphery of the first member wheel end so as not to interfere with the pivotable operation of said joint when said primary pivot connection is operative.

4. A pivotable joint according to claim 3 wherein one of said contact surfaces presents a rolling contact to the periphery to the wheel end of the first member and the other contact surfaces present fixed, friction contact surfaces for cooperation with the periphery of the wheel end of the first member.

5. A pivotable joint according to claim 4 wherein said friction contact surfaces are defined by presenting surfaces in the forked end of the second member, which surfaces extends substantially tangentially to the periphery of the wheel end of the first member so that the friction contact developed between the periphery of the wheel end of the first member and the tangential surfaces is line contact.

6. A pivotable joint according to claim 5 wherein said second member forked end has spaced side walls positioned on opposite sides of said first member wheel end, and wherein said wheel end of said first member is of reduced thickness about the periphery thereof so as to establish substantial lateral clearance between the reduced thickness periphery of the first member wheel end and the side walls of the forked end of the second member.

7. A pivotable joint according to claim 1 wherein two of said contact surfaces present a rolling contact with the periphery of the wheel end of the first member.

8. A pivotable joint according to claim 7 wherein said second member forked end has spaced side walls positioned on opposite sides of said first member wheel, wherein said two rolling contact surfaces are established by supporting two selectively circumferentially spaced rollers between said first member forked end side plate members, and wherein at least one of said roller members is so supported by a single bolt assembly so that but one bolt need be inserted to so position said one roller and, due to the selected circumferential spacing between rollers only said one bolt and the primary pivot bolt need be removed to disassemble the joint.

* * * * *